C. HUNTOON, W. C. ROLFES & W. L. WRIGHT.
PROTECTIVE MOUNTING FOR THE LENSES OF MOVING PICTURE MACHINES.
APPLICATION FILED SEPT. 1, 1911.
1,053,512. Patented Feb. 18, 1913.
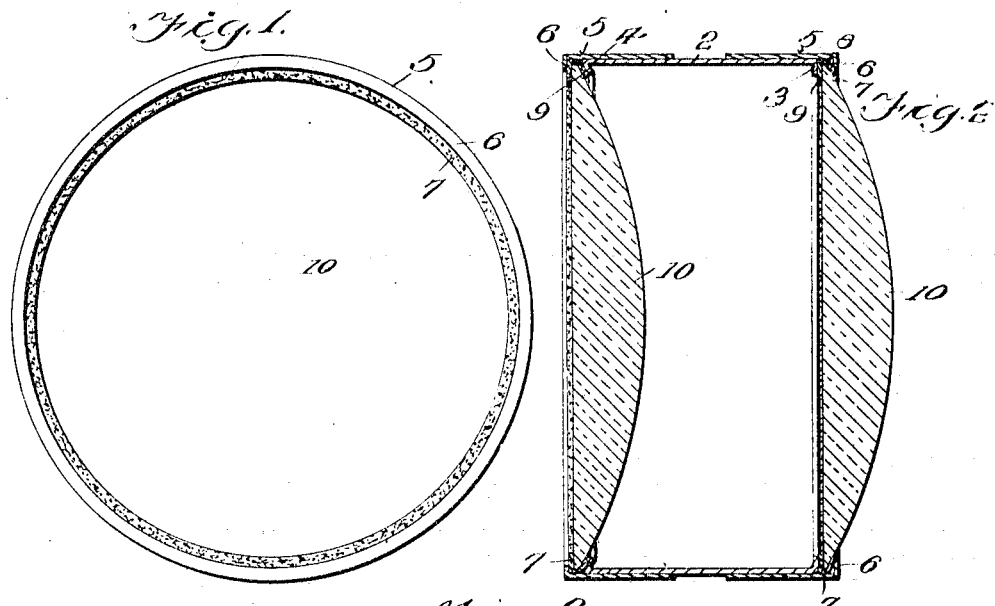
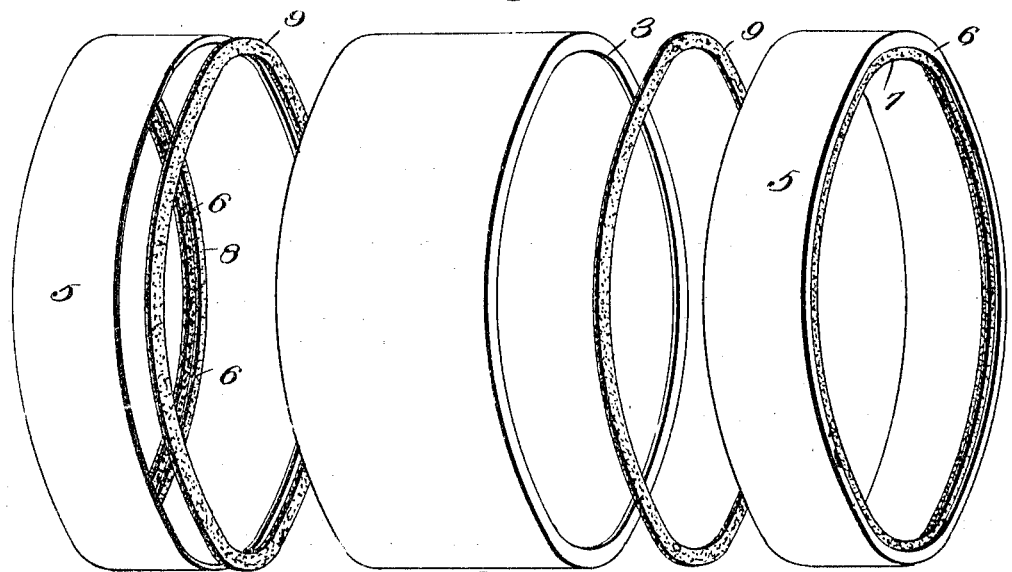
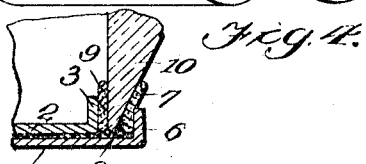
Witnesses
Cora N. Handy
Juana M. Fallin
Inventors
C. Huntoon,
W. C. Rolfes
W. L. Wright
By
A. N. Sacey, Attorneys

UNITED STATES PATENT OFFICE.

CHARLES HUNTOON, WILLIAM C. ROLFES, AND WALTER L. WRIGHT, OF LOS ANGELES, CALIFORNIA.

PROTECTIVE MOUNTING FOR THE LENSES OF MOVING-PICTURE MACHINES.

1,053,512.   Specification of Letters Patent.   Patented Feb. 18, 1913.

Application filed September 1, 1911. Serial No. 647,216.

*To all whom it may concern:*

Be it known that we, CHARLES HUNTOON, WILLIAM C. ROLFES, and WALTER L. WRIGHT, citizens of the United States, residing at Los Angeles, in the county of Los Angeles and State of California, have invented certain new and useful Improvements in Protective Mountings for the Lenses of Moving-Picture Machines, of which the following is a specification.

Our invention relates to machines for projecting moving pictures, and particularly to a mounting for the condensing lenses thereof.

In moving picture machines a plurality of condensing lenses are used. As usually mounted, these lenses are subjected to extreme variations of temperature and are therefore extremely liable to crack. The mounting for these lenses is of metal and the lenses contact directly with the metal. The metal mounting absorbs heat very readily and transmits the same to the lens. In other words, the lenses of these machines are not ordinarily insulated from the metal mounting thereof, which increases the liability of the lenses to crack. Furthermore, there is a direct contact between the lens and the metallic mounting, and as the glass and the metal have different coefficients of expansion, there is a great liability of the lenses to crack.

One object of our invention is to provide a mounting for these lenses which will allow more equal expansion and contraction of the lenses, thereby preventing them from cracking, and another object is to provide a mounting wherein the lenses are insulated by non-heat-conducting material from contact with the metal mounting.

Another object is to provide a very simple and effective mounting for lenses permitting the ready removal and replacement of the lens and yet holding the lenses securely in position when the mounting is inserted in the lamp housing.

An embodiment of our invention is illustrated in the accompanying drawings wherein:

Figure 1 is a face view of the lens mounting. Fig. 2 is a diametrical section through the body and the oppositely disposed lens caps. Fig. 3 is a perspective view of the mounting, the parts being separated. Fig. 4 is a fragmentary enlarged section of one of the caps and a portion of a lens.

Corresponding and like parts are referred to in the following description and indicated in all the views of the accompanying drawings by the same reference characters.

Referring to these drawings, 2 designates the body of the mounting comprising an annular metallic rim relatively wide and provided at its margins with the inwardly turned annular flanges 3 and 4. This rim is preferably made of relatively thin material and hence the flanges 3 and 4 are turned inward so as to secure a relatively wide abutting face at the side edges of the body 2.

The lenses 10 are contained within the oppositely disposed cells or caps 5 which have telescopic engagement with the body 2. Both caps are of the same construction and hence a description of one will apply equally well to the other. Each cap comprises an annular relatively wide rim of metal about half the width of the body portion 2 and somewhat larger in diameter than said body portion so as to slip snugly over the body portion. Each cap is provided at one end with the inwardly turned annular flange 6.

Disposed within each cap and held against the inside face of the flange 6 is a packing ring 7. This packing ring is preferably attached permanently in place against the flange 6 by means of any suitable adhesive compound, but preferably by means of a compound containing asbestos or other non-conducting material. The packing ring 7 is of such width that it projects beyond the flange 6, as illustrated in Fig. 3. A layer of asbestos is also permanently attached to the inner face of each cell or cap 5 by means of any suitable adhesive and extends inward beyond the inner face of the packing ring 7. This inwardly extending layer of asbestos or other non-heat-conducting material is designated 8.

The lens 10 may be of any suitable form but is shown as plano-convex, such being the ordinary form of condensing lens for use with moving picture machines. The margin of the lens rests against the packing ring 7, while the edge of the lens is protected from contact with the metal of the cap or cell 5 by means of the layer of asbestos 8.

Disposed upon the inner face of the lens 10 and contacting with the margin thereof is the packing ring 9 which is also of asbestos or other non-heat-conducting material and is preferably relatively flat. The packing ring fits snugly within the cell or cap 5 and contacts with the wall of the cap. It has practically the same thickness as the packing ring 7. Each lens 10 is loose within the corresponding cell, as is each of the packing rings 9. These cells 5, however, may be forced over or telescoped upon the body portion 2, and when they are forced home the flanges 3 and 4 will contact with the packing rings 9 and will hold the lenses 10 in proper position and properly spaced from each other, as shown in Fig. 2.

It will of course be understood that the cells or caps 5 fit the body portion 2 so snugly as to have frictional engagement with the body portion so that when the caps are forced tightly in place upon the body portion 2, the lenses will be held firmly in position and the caps 5 cannot become detached from the body portion 2 except with intention. When the caps have been placed upon the body portion 2 with the lenses in place as before described, the mounting is in condition for insertion in the lamp house. It has not been considered necessary to show any portion of the lamp as the construction thereof is well known.

While we have found that asbestos is extremely effective as a means of insulating the lenses from contact with the metal mounting, we do not wish to be limited to this as it is obvious that other non-conducting material might be used. It will be seen that no metal touches the lenses. The packing ring 7 separates the front face of each lens from the flange 6; the layer 8 of non-conducting material separates the edge of each lens from the metal of the cell, while the packing ring 9 separates the inner face of the lens from contact with the flanges 3 or 4. Thus while the lenses are held firmly in place, they are entirely insulated from contact with the metal mounting, and hence the heat transmitted to this metal mounting cannot be in turn transmitted to the lenses. Furthermore, it will be obvious that the glass of the lenses may freely expand and that there will be no danger of cracking the lenses from this cause. The purpose of the asbestos is to prevent a too rapid cooling of the edges of the lens. This permits a more even contraction of the glass and prevents cracking the condensing lens, which cracking initially commences at the edge of the lens. The packing permits a perfectly free expansion of the lens owing to the flexibility of the asbestos or of any equivalent non-heat-conducting material, and this packing also permits of an even contraction of the edge of the condenser.

What we claim is:

1. A mounting for the condensing lenses of moving picture machines, including an annular cell having an inwardly turned flange at one end, a non-heat-conducting packing ring disposed within the cell and against said flange, a lens within the cell and supported against the packing ring, non-heat-conducting material disposed between the edge of the lens and the inner face of the cell, a packing ring of non-heat-conducting material disposed against the inner face of the margin of the lens, and an annular member slightly less in diameter than the cell inserted therein and bearing against said last named packing ring to hold the lens in place.

2. A mounting for the condensing lenses of moving picture machines, including an annular, relatively wide body portion having an inwardly extending flange on each margin, opposed caps forming cells for condensing lenses and having telescopic engagement with the body portion, each of said caps having an inwardly turned flange upon one margin, condensing lenses located in said caps, non-heat-conducting material disposed between each lens and the adjacent flange of the cap and surrounding the edge of the lens, and removable packing rings of non-heat-conducting material disposed upon the inner faces of the margins of the lenses with which the flanged ends of the body portion engage to hold the lenses in place.

In testimony whereof we affix our signatures in presence of two witnesses.

CHARLES HUNTOON. [L. S.]
WILLIAM C. ROLFES. [L. S.]
WALTER L. WRIGHT. [L. S.]

Witnesses:
STEPHEN MONTELEONE,
F. M. SHEPARD.